*INVENTOR.*
ALLAN H. CANDEE

Patented Mar. 3, 1953

2,629,973

UNITED STATES PATENT OFFICE 2,629,973

METHOD AND APPARATUS FOR RELIEVING CUTTER BLADES

Allan H. Candee, Brighton, N. Y., assignor to Gleason Works, Rochester, N. Y., a corporation of New York Application July 19, 1950, Serial No. 174,648

9 Claims. (Cl. 51—105)

The present invention relates to the relieving of cutting tools, and more especially to the relief-grinding of the blades of face-mill gear cutters.

Face-mill gear cutting blades have side cutting and tip cutting edges. To provide cutting clearance behind the cutting edges, the side and tip-cutting surfaces of the blades are relieved back of the front faces of the blades. To avoid a sharp corner at the juncture of a side and the tip-cutting edge of a blade, it is usual to round the blade at this juncture.

Heretofore, separate operations have been required for relief-grinding the opposite sides, the tips, and the rounds at the junctures of the sides and tips of the blades. Furthermore, heretofore, no method has been known for producing the desired circular arc at the juncture of the side and end surfaces except by generating the rounds; and that is a slow process. The more-frequently used "plunge-grinding" process for producing the rounds is not subject to accurate control of shape.

With the processes conventionally employed for relieving face-mill gear-cutter blades, moreover, cylindrical grinding wheels have been employed for relief-grinding the sides of the blades, and the angular positions of these wheels have to be changed for grinding blades of different pressure angles. Also, the required angular positions of the wheels vary with the wheel diameter.

Other drawbacks of the prior conventional methods of relief-grinding face-mill cutter blades, and the advantages of the present process will best be understood perhaps by first briefly considering prior practice.

In the process of Gleason U. S. Patent No. 1,285,124, granted November 19, 1918, which is the process originally devised for relief-grinding face-mill gear-cutter blades, and which is a process still extensively used, cylindrical grinding wheels are employed for grinding the sides of the blades, while the ends or tips are ground with the end face of a cupped wheel. The axis of the wheel for grinding each side is in the same horizontal plane with the axis of the cutter and set at an angle approximately equal to the pressure angle of the side surface, there being a slight difference or correction for pressure angle required, varying with the wheel diameter. The wheel axis is adjusted angularly about an axis perpendicular to the plane containing the axes of the cutter and wheel. With this process, the line of contact between the wheel and the blade surface being ground is displaced from the common axial plane of the wheel and cutter and inclined thereto, with the result that although the wheel be dressed to a straight profile it produces a curvature, very slight, on the cutting edge of the blade. Moreover, with this process four wheels are required, one for each side of the blade, one for the tip, and one for the edge round; and separate operations are required for grinding the cutting side, the end surface, and the edge round.

In the method of the Johanson and Wildhaber U. S. Patent No. 2,410,348, granted October 29, 1946, a cylindrical wheel is again employed, and is positioned with its axis in a horizontal plane above or below, that is, offset from, the cutter axis. The wheel axis is parallel to the side-cutting edge of the blade; and the offset of the wheel is obtained by angular adjustment about an axis parallel to the cutting edge. The wheel has to be adjusted angularly for the pressure angle of the side surface of the blade, but no correction is required in this pressure-angle setting for change in the wheel diameter. The cylindrical wheel used in this process produces, however, a slight curvature on the cutting edge of the blade. Moreover, separate wheels and separate operations are required for relief-grinding the cutting side, the end surface, the edge round and the non-cutting surface. With changing wheel diameter, the wheel is adjusted along a line normal to the blade surface and in a plane containing the cutting edge, that is, in a direction perpendicular to the wheel axis.

With the processes of either of these patents, the rounds at the junctures of the side and tip surfaces of the blades have to be ground in a separate operation from the relieving of the side and tip surfaces. Even so, the desired circular arc on the round has heretofore only been achievable through generation of the round as in the process of the Johanson Patent No. 2,231,762, granted February 11, 1942, which is slow and costly.

One object of the invention is to provide a method and apparatus for relief-grinding face-mill gear-cutter blades in which the pressure angle of the blades may be controlled to extreme accuracy by the shape dressed on the grinding wheel, and is not controlled, as in prior relief-grinding processes by the direction of the wheel axis.

A further object of the invention is to provide a process and apparatus for relief-grinding cutting tools, and especially gear cutter blades, in which it is unnecessary to change the direction of the grinding profile of the wheel when the diameter of the wheel is changed.

A still further object of the invention is to provide a process and apparatus for relief-grinding cutting tools, and especially face-mill gear-cutter blades, in which the profile dressed on the grinding wheel may be maintained in a fixed position in the grinding machine.

Another object of the invention is to provide a process for relief-grinding tools, and especially face-mill gear-cutter blades, in which the cutting side and the end surface of a blade may be ground simultaneously in one operation and by the same grinding wheel.

Another object of the invention is to provide a process and apparatus for relief-grinding tools, and especially face-mill gear-cutter blades, in which the cutting side, and the end surface, and the edge round connecting these two surfaces may be relief-ground simultaneously in one operation and by the same grinding wheel.

Another object of the invention is to provide a process and apparatus for relief-grinding tools, and especially face-mill gear-cutter blades which will be faster than relief-grinding processes heretofore employed.

A further object of the invention is to provide a process and apparatus for relief-grinding tools, and especially face-mill gear-cutter blades in which the side and tip surfaces and the edge round may be ground in such wise as to provide a continuous smoothly blended blade outline.

A further object of the invention is to provide a process and apparatus for relief-grinding tools, and especially face-mill gear-cutter blades, in which the accuracy of the blending of the edge round with the side and end surfaces of the blade may be improved.

A further object of the invention is to provide a process and apparatus for relieving tools, and especially face-mill gear-cutter blades, through which the region of contact between the surface of the grinding wheel and the two or three blade surfaces, which are to be relieved, is restricted to as short an extent as possible around the axis of rotation of the cutter.

Another object of the invention is to provide, a process and apparatus for relieving tools, and especially face-mill gear-cutter blades, in which the region of contact between the grinding wheel and the surfaces to be relief-ground is confined as close as possible to an axial plane of the cutter.

A still further object of the invention is to provide a method and apparatus for relief-grinding cutting tools, and especially face-mill gear-cutter blades, through which a side, the tip and the round, which joins a side with the tip of a blade, may be ground simultaneously with a single grinding wheel to the correct relief.

Still another object of the invention is to provide a method and apparatus for relief-grinding cutting tools, and especially face-mill gear-cutter blades, in which the inside, outside tip surfaces of the blades, and the rounds, which join the side surfaces with the tip surfaces, may be ground with but two wheels, one for the outside blades, and the other for the inside blades.

Other objects of the invention will be apparent hereinafter from the specification and from the recital of the appended claims.

Figure 6:
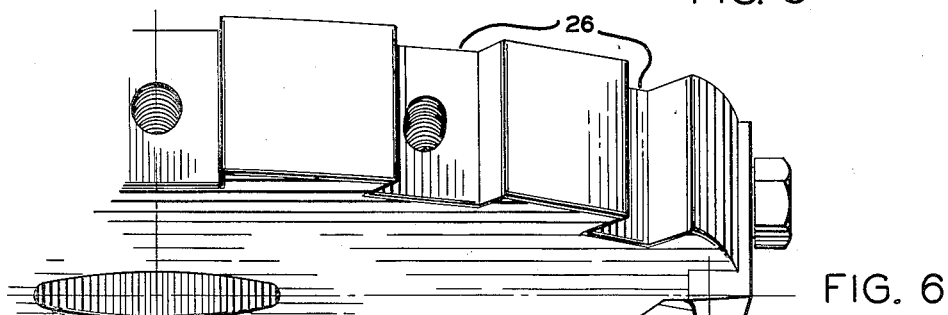
Figure 6:
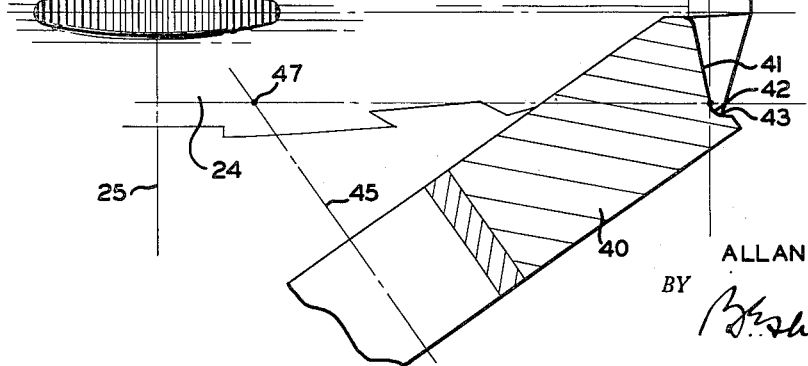
Figure 7:
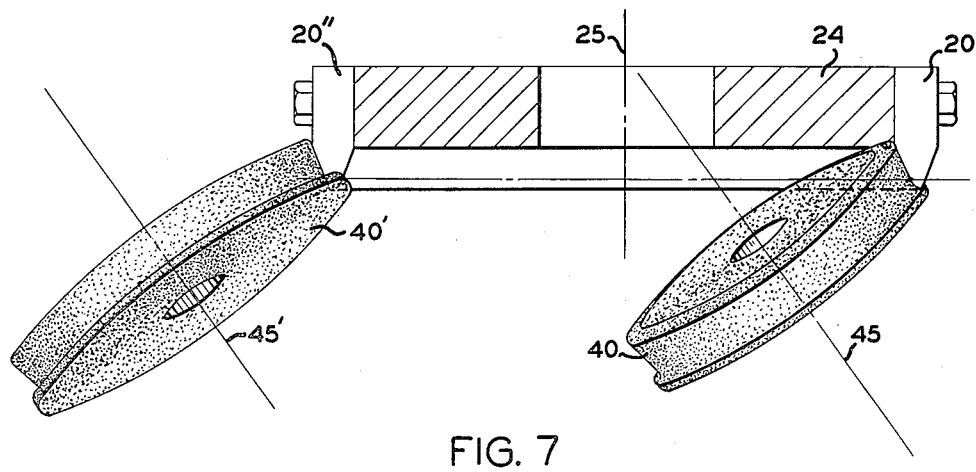
Figure 8:
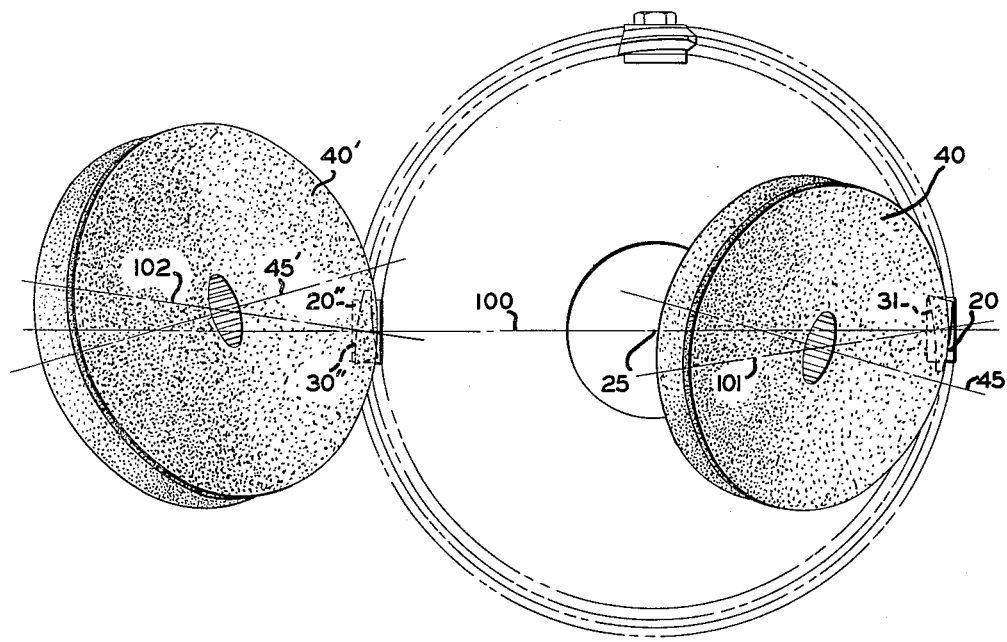
Figure 9:
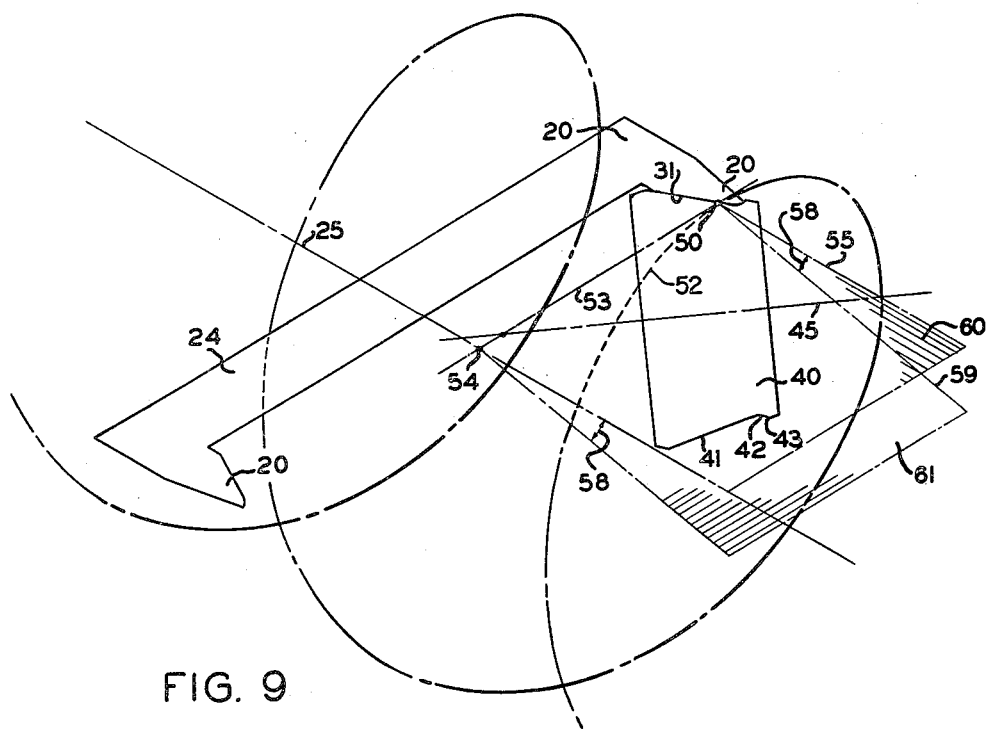
Figure 10:
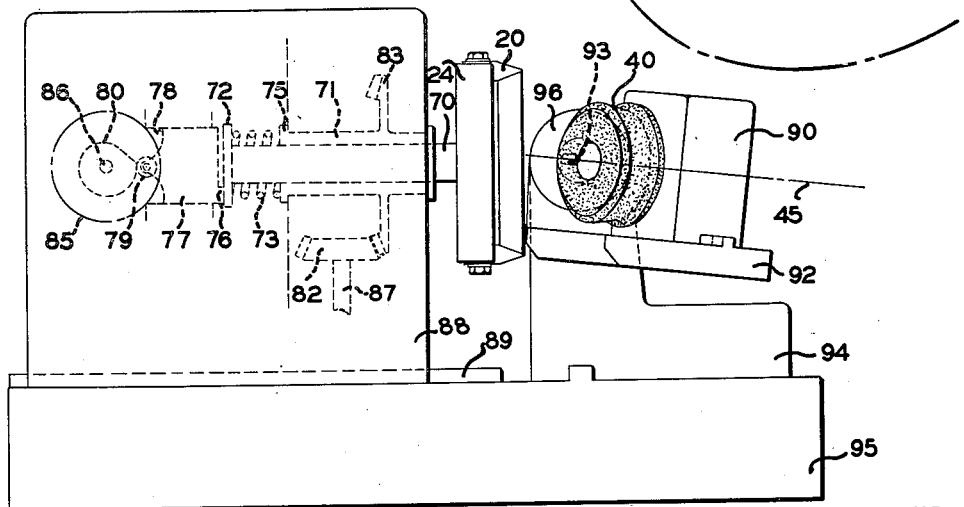

Fig. 6 is a fragmentary view illustrating somewhat diagrammatically the method of the present invention, the view being taken in an axial plane of the grinding wheel, and showing the relative positions of the grinding wheel and a blade of a face-mill gear cutter in the relief-grinding operation, and showing how the inside and tip surfaces of the blade and the round at the juncture of these surfaces may be ground simultaneously;

Fig. 7 is a view taken in an axial plane of the cutter and showing the relative positions of the cutter and the grinding wheel in relief-grinding of both the inside and outside surfaces as well as the tip surfaces of blades according to the method of the present invention;

Fig. 8 is a more or less diagrammatic view showing in elevation the relieving of these surfaces of the blades;

Fig. 9 is a perspective diagrammatic view showing the geometrical relationships in space involved in positioning the grinding wheel and the face-mill cutter for grinding the cutter blades by the method of the present invention; and Fig. 10 is a more or less diagrammatic view showing one form of relieving-grinder constructed according to this invention.

In the processes heretofore employed for relief-grinding the sides and tips of face-mill gear-cutter blades, cutting clearance has been achieved by grinding the side and tip surfaces as helical surfaces coaxial with the cutter axis with two separate grinding wheels. The present invention rests upon the discovery of a way to grind the side and tip surfaces of the blades with the same helical motion, and simultaneously, with but a single grinding wheel. In addition, the invention makes it possible and practical to grind also a rounded edge at the juncture of the side and tip of the blade, accurately to any desired shape, and in the same operation with the side and tip surfaces. The rounded edge is ground as a helical surface coaxial with the helical side and tip surfaces.

Reference will now be had to the drawings for a more detailed description of the invention. 20 denotes a face-mill gear-cutter blade. The blade shown is for use in a cutter of the inserted-blade type, although the invention applies equally to the relieving of blades of segmental-type cutters, where several blades are integral with one another and form parts of a cutting segment, and to the relieving of face-mill cutters, where the blades are integral with the cutter head.

Figure 2:
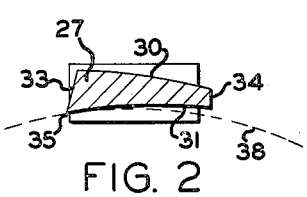
Fig. 2 is a section through the cutting portion of this blade taken on the line 2—2 of Fig. 1.

The blade 20 has a shank portion 21 and a cutting portion 27 (Fig. 2). The shank portion 21 of the blade is adapted to be secured in a face-mill cutter head 24 so that the cutting portion 27 of the blade projects beyond one side-surface of the head in the general direction of the axis 25 of the head. The shank of the blade is adapted to be secured in a slot 26 of the face-mill cutter head 24 by a screw 23 that passes through the hole 22 in the shank, and that threads into the cutter head.

Figure 1:
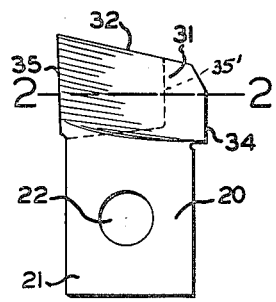
Fig. 1 is a side elevation of a conventional face-mill gear-cutter blade such as may be relieved by the method and the apparatus of the present invention.
Figure 3:
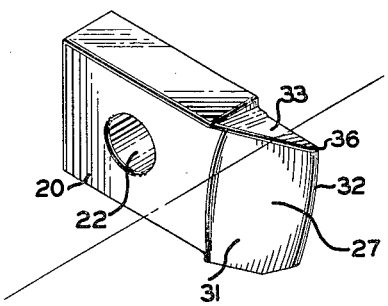
Fig. 3 is a perspective view of the blade.
Figure 4:
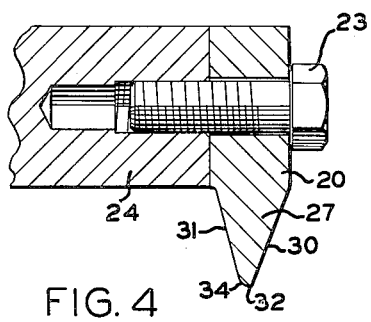
Fig. 4 is a fragmentary axial section through a face-mill gear cutter, showing mounted therein a blade having side surfaces of straight profile.

The cutting portion 27 of the blade has outside and inside surfaces 30 and 31, respectively, a tip or end surface 32, a front face 33, and a rear face 34. The blade shown in Figs. 1 to 3 inclusive is an inside-cutting blade and its front face 33 is sharpened with a side rake so that the front face forms an acute angle with the inside surface 31 of the blade, thereby forming the inside cutting edge 35. Dotted lines 35' indicate the form of the blade after repeated sharpenings.

To achieve proper cutting action, the inside surface 31 and the tip surface 32 of the blade must be relieved back of the cutting edges 35 and 36 to provide proper cutting clearance. With the method and apparatus of the present invention the cutting-side surface of the blade, the tip or end surface, and the round are relief-ground simultaneously.

In the relief-grinding operation, the blades, which are to be relieved, are secured in the slots 26 (Fig. 6) of the cutter head 24, and a grinding wheel is employed such as denoted at 40. This grinding wheel is dressed to have a profile 41, which is suitable for grinding the required side surface of the blades, a rounded portion 42, which is suitable for grinding the desired edge round on the blades, and a surface 43, which is suitable for grinding the tip or end surface of the blades, so that side, round and tip surfaces can be relief-ground simultaneously. The grinding wheel is positioned relative to the cutter, whose blades are to be relieved, so that the axis 45 of the wheel is inclined to the axis 25 of the cutter head. The cutter head is rotated on its axis 25, and the grinding wheel is rotated on its axis 45, and simultaneously a relative helical relieving motion is imparted between the cutter and the grinding wheel about and in the direction of the axis 25 of the cutter head. This produces the desired relief on the three surfaces of the blade.

Fig. 9 is a perspective diagram showing the geometrical relationships in space of the grinding wheel 40, the face-mill cutter 24, and cutter blade 20 in the grinding operation of the present invention. The axis 25 of the cutter is here shown as horizontal; and the cutter head 24 is here shown with the outlines of two diametrically opposite blades 20 disposed in a horizontal plane through the cutter axis. At a mean point 50 in the helically-relieved inside surface 31 of one cutter blade 20, there is an imaginary helix curve 52 passing through this point 50. At the mean point 50 there is drawn a radial line 53 perpendicular to and intersecting the cutter axis 25 in the point 54. Also at the mean point 50 there is drawn a line 55 parallel to the cutter axis 25. The plane 60 is the horizontal plane through the cutter axis 25 and the mean point 50 and containing lines 53 and 55. Perpendicular to the radial line 53 at the mean point 50 is a line 59. This line 59 makes an angle 58 with line 55 equal to the lead angle of the helix 52. Plane 61, which contains radial line 53 and line 59, is thus normal to the helix 52 and also normal to the side surface of the blade in which the helix lies.

In the process of the present invention, the axis 45 of the rotating grinding wheel 40 is positioned to lie in the normal plane 61 and the wheel outline shown lies in this plane. Because the axis of the grinding wheel lies in the plane 61, which is normal to the helical blade surface at mean point 50, it is known that the surface of the wheel can and will be in tangent contact with the desired inside blade-surface at said mean point 50, and that other points of tangent contact will occur at positions close to the axial profile of the wheel in plane 61, even at the end surface of the blade. Thus tangent contact on the side, tip, and edge-round surfaces of the blade with the wheel is restricted to a region close to the axial plane 61 of the grinding wheel, which makes it practical to grind the side surface, tip surface and round simultaneously.

The formed outline of the grinding wheel is based on a selected mean point 50 chosen at a favorable position on the blade surface. The contact between the surface 41—42—43 of the grinding wheel and the cutter blade is not restricted to the axial plane of the wheel or to the axial plane of the cutter. As a result there is a slight difference between the shape of the wheel and of the blade in their axial sections. This condition is taken into consideration in determining the shape of the outline to be dressed on the grinding wheel, to produce on the cutter blade a profile of the desired shape. For instance, if it is desired that the inside surface of the cutter blade be of straight profile shape, then a slight curvature must be dressed on the surface 41 of the grinding wheel.

Figure 5:
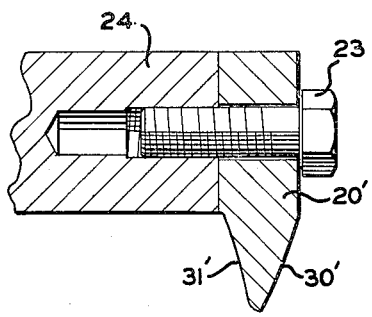
Fig. 5 is a similar fragmentary axial section, showing a face-mill gear cutter having a blade whose side surfaces are of curved profile shape.

The method of the present invention is not restricted, however, to the grinding of blades of straight profile, for blades of curved profile shape may also be ground. A blade of this type, a so-called spherical cutter blade, is shown in Fig. 5. Here the blade 20' has an inside profile 31' of concave curvature and an outside profile 30' of convex curvature. The centers of curvature of these profiles may be on the axis of the cutter or may be offset therefrom. For relief-grinding the surfaces of the blade 20' the grinding wheels will be dressed to a profile curvature slightly different from the profile curvature of the side surfaces 30' and 31' of the blade, and otherwise the operation will be similar to that already described.

In Fig. 10 there is shown diagrammatically one form of apparatus which may be used for relief-grinding face-mill gear-cutting blades according to the present invention. Here the cutter head 24 is secured to a rotary spindle 70 which is reciprocably mounted within a sleeve 71 that has a sliding spline connection with the spindle. The spindle 70 has an enlarged head 72 at its rear end. This head is held by a coil spring 73, that surrounds the spindle and that is interposed between the head and a flange 75 on the sleeve 71, against a nose 76 on a block 77. Block 77 is slidable in a cylindrical guide 78. This block carries at its rear end a roller 79 which engages the peripheral surface of a cam 80. The cam 80 is driven by suitable gearing, in timed relation with the rotation of the cutter spindle 70, to make one revolution for each of the equi-spaced blades of the cutter head. The cam 80 is constructed in conventional manner to impart the required lead motion to the cutter head, which, in combination with the rotation of spindle 70, makes up the helical motion for relief-grinding each blade as it rotates by the grinding wheel.

In Fig. 10 the sleeve 71 is shown as driven by a bevel or hypoid pinion 82 which meshes with a bevel or hypoid gear 83 that is secured to the sleeve, and the cam 80 is shown as driven by a coaxial bevel or hypoid gear 85. The shaft 86, to which the cam 80 and the bevel or hypoid gear 85 are secured, is driven in time with the shaft 87, to which the bevel or hypoid pinion 82 is secured.

The grinding-wheel spindle is journaled in a head 90 which is mounted upon a carrier 92 and is slidably adjustable thereon in a direction perpendicular to the wheel axis 45 for the purpose of compensating for changes in the wheel diameter. The carrier 92 is mounted on a head 94 for angular adjustment about an axis that lies in the same plane as the axis of the work spindle 70 and is perpendicular thereto. This adjustment is for the purpose of inclining the grinding-wheel axis so that it lies in the plane 61 of Fig. 9. For the purpose of this adjustment, the carrier 92 has a trunnion journaled in the bearing housing 96 of head 94. Head 94 is adjustable laterally upon the base 95 of the machine. The spindle 70, sleeve 71, block 77, and shaft 86 are journaled in a head 88 which is adjustable axially of work spindle 70 on ways 89 formed on the base 95 of the machine. This adjustment is to bring the work into operative relation with the wheel. The adjustment of slide 94, which is to adjust the wheel in accordance with the diameter of the cutter, is at right angles to the direction of adjustment of the head 88. The axis 45 of the grinding wheel intersects the axis of the trunnion and remains at a permanently fixed angle thereto.

The grinding wheel may be driven by a motor or in any suitable manner. The cam 80 and shaft 87 may be driven by the same motor as the wheel, or by a separate motor. As the cam 80 rotates, the work spindle 70 is reciprocated axially. The relieving operation by helical motion is repeated for each blade and is like that conventionally used.

The diamond pointed tool for dressing the wheel is denoted at 93. It may be mounted in any suitable manner on the machine, and may be either manually or automatically operated. It will be actuated and controlled to produce the required outline on the grinding wheel. The dressing mechanism forms no part of the present invention.

With the method of the present invention, the wheel axis 45 lies in a plane 61 (Fig. 9) normal to the helix 52 at the selected point 50 in the blade surface 31, and is not parallel to the cutting edge of the blade. Adjustment for change in diameter of the wheel is in this plane 61 normal to the helix but in a direction perpendicular to the wheel axis 45 and not normal to the blade surface. Change in pressure angle of the blades and change in the profile shape of the blades can be obtained by dressing the wheel to a different shape, and this does not require adjustment of the wheel position. The wheel axis 45 intersects radial line 53 and the line 59 normal to the mean helix 52. As has been described, the wheel axis remains at a fixed angle with a radial line 53, and the angular adjustment of the wheel position about this radial line 53 is for the purpose of obtaining contact between wheel and blade surfaces at mean point 50 in the horizontal plane 60 that contains the cutter axis 25. Both the shape and the position of the wheel outline are determined by the position of the wheel dressing means.

Although Fig. 10 shows only a single grinding wheel, in practice the relieving machine will preferably be constructed to employ two grinding wheels for simultaneous operation as shown diagrammatically in Figs. 7 and 8. Here, the cutter head 24 contains both outside and inside cutting blades, alternating around the periphery of the cutter. 40 is the grinding wheel for grinding the inside surfaces, the tip surfaces, and the rounds joining the inside and tip surfaces of the inside blades 20 of the cutter. 40' is a wheel for grinding the outside surfaces, the tips, and the rounds of the outside blades 20'' of the cutter.

As will be seen from Fig. 8, the axes 45 and 45' of the wheels for grinding the inside and outside blades are oppositely inclined to a horizontal plane 100 passing through the axis 25 of the cutter head. 101 is a line normal to the inside surface 31 of an inside blade 20, and 102 is a line normal to the outside surface 30'' of an outside blade 20''. The non-cutting sides of the blades may be ground with conical wheels or cylindrical wheels, or the non-cutting sides of the inside blades 20 may be ground with the wheel 40' and the non-cutting sides of the outside blades 20'' may be ground with the wheel 40. Since alternate blades are opposite side-cutting blades, the inside blades will preferably be removed during grinding of the outside blades, and the outside blades will be preferably removed during the relief-grinding of the inside blades, and the cutter head will be double-indexed, as conventional.

As illustrated, the invention is shown as applied to the grinding of blades which are arranged circularly in a cutter head, and the axial relieving movement is effected as each blade is moved past the grinding wheel. The blades, however, might be helically arranged upon a rotary head and the relieving movement effected by imparting only one axial movement as a group of blades rotates past the grinding wheel. As already stated, while the invention has been described in connection with the relief-grinding of cutters of the inserted blade type, it will be understood that the invention may also be employed for relief-grinding segmental type blades or for relief-grinding cutters in which the blades are integral with their cutter head. The invention may also be applied to the relief-grinding of various shapes of face-mill gear cutter blades. Thus it may with advantage be employed in relieving blades of the type disclosed in McMullen U. S. Patent No. 2,385,220, granted September 18, 1945, for with the method of the present invention both portions of the side surface of a blade, the tip, and the edge round of the blade can be relief-ground simultaneously with a single wheel.

It will further be understood that while the invention has been described in connection with particular embodiments thereof it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. The method of relief-grinding simultaneously a side surface and the end surface of a face-mill gear cutter blade which comprises mounting the blade in a rotary head, positioning a grinding wheel, that has its profile shaped to have a portion for grinding the side surface and another portion for grinding the end surface of the blade, in engagement with the said side and end surfaces of the blade, and rotating the wheel on its axis while effecting a relative helical motion between the wheel and head about and in the direction of the axis of the head to grind said side and end surfaces as helical surfaces coaxial with the head, the axis of the grinding wheel being positioned to lie in the plane normal to the helix curve that passes through a point lying in one of the said surfaces of the blade.

2. The method of relief-grinding simultaneously a side surface and the end surface of a face-mill gear cutter blade which comprises mounting the blade in a rotary head, positioning a grinding wheel, that has its profile shaped to have a portion for grinding the side surface and another portion for grinding the end surface of the blade, in engagement with the said side and end surfaces of the blade, and rotating the wheel on its axis while effecting a relative helical motion between the wheel and head about and in the direction of the axis of the head to grind said side and end surfaces as helical surfaces coaxial with the head, the axis of the grinding wheel being positioned to lie in the plane normal to the helix curve that passes through a point lying in one of the said surfaces of the blade and close to the other surface of the blade.

3. The method of relief-grinding simultaneously a side surface and the end surface of a face-mill gear-cutter blade which comprises mounting the blade in a rotary head, positioning a grinding wheel that has its profile shaped to have a portion for grinding the side surface of the blade and another portion for grinding the end surface of the said side and end surfaces of the blade, in engagement with the blade, and rotating the wheel on its axis while effecting a relative helical motion between the wheel and head about and in the direction of the axis of the head to grind said side and end surfaces as helical surfaces coaxial with the head, the axis of the wheel being positioned to lie in the same plane with a line passing through a point lying in one of the said surfaces of the blade and radial of the axis of the head, said plane being inclined about said radial line to a plane containing said line and the axis of the head to make an angle equal to the lead angle of the helix curve passing through said point.

4. The method of relief-grinding simultaneously a side surface and an end surface of a face mill gear cutter blade and a rounded surface joining the said side surface and the said end surface, which comprises mounting the blade in a rotary head, positioning a rotary grinding wheel, which has its profile shaped to grind all said surfaces, in engagement with said surfaces, and rotating the wheel on its axis while effecting a relative helical motion between the wheel and head about and in the direction of the axis of the head to grind said side, end, and rounded surfaces as helical surfaces coaxial with the head, the axis of the wheel being positioned to lie in the plane normal to the helix curve that passes through a point in one of said three surfaces.

5. The method of relief-grinding outside, inside, and end surfaces of blades of a face-mill gear cutter which comprises mounting a plurality of blades in a rotary head, positioning two grinding wheels, one of which has a profile shaped to grind simultaneously one side and the end surface of one blade and the other of which has a profile shaped to grind simultaneously the other side and the end surface of a blade disposed in a diametrically opposite position of the rotary head, in engagement with the said side and end surfaces of the said blades so that the axes of the two wheels are both inclined to the axis of the head but oppositely inclined to the plane containing the axis of the head and one mean point in each of the two said side surfaces and so that the axis of each wheel lies in the plane normal to a helix curve lying in the respective blade surfaces to be ground by that wheel and passing through the respective said points, and rotating the head on its axis while effecting a relative relieving motion between the wheels and head about and in the direction of the axis of the head to grind helical outside, inside and end surfaces on the blades.

6. In a machine for relieving blades of a face-mill gear-cutter, a frame, a work head, a tool head, a work spindle journaled in the work head, a tool support mounted on the tool head for adjustment about an axis perpendicular to and intersecting the axis of the work support, a slide adjustably mounted on the tool support, a rotary relieving tool journaled in the slide with its axis at right angles to the direction of adjustment of said slide, and inclined to the axis of adjustment of the tool support and lying in the same plane therewith, said heads being adjustable relative to one another on the frame in two directions, one axial of the work support and the other at right angles to the axis of the work support, means for rotating the tool, and means for effecting a relative helical motion between the tool and work supports about and in the direction of the axis of the work support.

7. In a machine for relieving blades of a face-mill gear-cutter, a rotary work support, a rotary relieving tool having a working surface shaped to relieve simultaneously a side surface and the tip surface of a blade of the cutter, and the rounded surface joining said side surface and said tip surface, means for adjusting the tool so that its axis lies in a plane normal to a helix lying in one of the said surfaces, means for rotating the tool, and means for simultaneously effecting a relative helical motion between the tool and work supports about and in the direction of the axis of the work support.

8. In a machine for relieving blades of a face-mill gear-cutter, a rotary work support, a rotary relieving tool having a working surface whose profile is inclined to the axis of the tool and is shaped to relieve simultaneously a side surface and the tip surface of a blade of the cutter, means for adjusting the tool about an axis perpendicular to the axis of the work support and intersecting the axis of the work support, means for rotating the tool, and means for simultaneously effecting a relative helical motion between the tool and work supports about and in the direction of the axis of the work support.

9. In a machine for relieving blades of a face-mill gear cutter, a rotary work support having its axis in a horizontal plane, a pair of rotary relieving tools, each of which has a working surface whose profile is inclined to the axis of the tool and shaped to relieve simultaneously a side surface and the tip surface of a blade of the cutter, adjustable tool supports in which said two tools are respectively, journaled one of said tool supports being adjustable to position the tool mounted thereon to relieve the outside surfaces of the blades of the cutter and the other tool support being adjustable to position the tool mounted thereon to relieve the inside surfaces of blades of the cutter, said two tool supports being each adjustable about a horizontal axis that intersects and is at right angles to the axis of the work support to position said tools so that their axes are oppositely inclined to said horizontal plane, means for rotating the tools on their respective axes, and means for rotating the work spindle on its axis and for simultaneously effecting an axial reciprocating movement of the work spindle.

ALLAN H. CANDEE.

REFERENCES CITED

The following references are of record in the file of this patent:

UNITED STATES PATENTS

| Number | Name | Date |
|---|---|---|
| 1,285,124 | Gleason | Nov. 19, 1918 |
| 2,210,273 | Wilhaber | Aug. 6, 1940 |
| 2,231,762 | Johanson | Feb. 11, 1941 |
| 2,308,734 | Wilhaber | Jan. 19, 1943 |
| 2,332,420 | Wilhaber | Oct. 19, 1943 |
| 2,332,421 | Wilhaber | Oct. 19, 1943 |
| 2,410,348 | Johanson et al. | Oct. 29, 1946 |